June 9, 1953  J. V. BERTRAND  2,641,381
SEALING MEANS FOR PRESSURE VESSELS
Filed Nov. 18, 1948

INVENTOR.
JOSEPH V. BERTRAND
BY
Hammond & Littell
ATTORNEYS

Patented June 9, 1953

2,641,381

UNITED STATES PATENT OFFICE 2,641,381

SEALING MEANS FOR PRESSURE VESSELS

Joseph V. Bertrand, Brooklyn, N. Y., assignor to Hydropress, Incorporated, New York, N. Y., a corporation of Delaware Application November 18, 1948, Serial No. 60,730

2 Claims. (Cl. 220—46)

This invention relates to a seal for the closure of a vessel or receptacle and particularly a receptacle wherein extremely high gaseous or liquid pressures are involved.

In previous devices, it has been difficult to properly seal the closures for the usual openings in a receptacle so as to prevent the escape of fluids such as gases or liquids from the interior of the vessel. This is particularly true of an opening having a closure which must be removed frequently for various purposes, such as loading, cleaning, inspection, etc. The problem is especially difficult when high pressures are employed, such as pressures in the range, for example, of 20,000 to 30,000 lbs. per square inch. This is especially true where the fluid to be sealed has a low viscosity. At such pressures, there may be considerable expansion of the various elements involved. Also, when the temperatures are elevated, there will be expansion of the various parts with resultant problems in maintaining a seal at high pressure.

In prior devices, where a gasket such as one made from copper has been used, the sealing has depended only upon plastic deformation of the metal. The deformation has permitted the soft metal to enter and conform with the surface irregularities of the mating surfaces. Thus, when disassembly of the parts occurs, a new gasket or seal has been required upon reassembly.

When two surfaces meet in a pressure vessel to form a closure, they may form a passage for the pressurized fluid because of dimensional differences in manufacture and because of surface finish conditions. Even when dimensioned correctly, the surface finish may be such as to provide minute passages for the fluid.

Rubber or similar resilient materials are not suited for high pressures because of the low shear properties thereof, and unsuitable high temperature properties. Some rubbers also are too porous to be used for high pressure sealing.

As just mentioned, when a metal such as copper is used, substantially all of the metal of the seal is deformed beyond the elastic limit so that plastic deformation takes place.

In the present invention, the entire seal is not deformed beyond the elastic limit, but instead, the resiliency of the metal is employed. In one form of the invention, the seal element may comprise at least a pair of connected legs. In such a form, one of the connected elements, or legs of the seal, contacts the walls of the pressure vessel elastically and the other element or leg also contacts another part of the vessel or a seat elastically. The dimensions of the seal relative to its seat is made such that the initial pressure due to said dimensions of the parts is used to insure a tight seal as the pressure builds up in the vessel.

The pressure of the sealed fluid will tend to deform plastically portions of the surfaces of the metal relative to each other, particularly the mating surfaces so as to take care of surface irregularities. Thus, in the present invention, a combination of resiliency and plastic deformation may be employed. As will be explained hereafter, a thin layer of metal between the metal surfaces can be used, the thin layer serving to eliminate certain defects encountered in high pressure practice.

One of the objects of the present invention is to provide a seal for sealing the joint between a vessel and a closure therefore, especially for high pressure work.

Another object of the invention is to provide a seal arrangement wherein the seal is placed in a prestressed condition when assembled in the vessel and before a substantial pressure is attained within the vessel.

Another object of the invention is to utilize both resiliency and plastic deformation of the seal metal.

One of the features of the invention is the provision of a seal for closing the joint between a plug, cap, or closure member for a receptacle and the surrounding wall or element in which the closure is placed. The seal element itself preferably is made of a suitable metal and constructed and dimensioned so that it is in a prestressed condition when in assembled relationship with the vessel or receptacle and closure therefor. The closure member, of course, can take various shapes and forms and may be, for example, a plug through which a reciprocating member can pass. The closure member also may be bolted or fastened to the vessel as desired.

The prestressing of the seal element can be accomplished in various manners. In one form of seal, an annulus is employed, said annulus having a leg or skirt extending generally in the direction of the axis of the annulus and a second leg joined thereto in a plane substantially perpendicular or transverse to the axis of the annulus, it not being necessary that the transverse leg be exactly in said plane. In the preferred form, the two legs are joined by a curved portion and the angle between the legs is less than about 90°. For the purposes of this application, this may be termed an L shaped annulus. The angle may be greater or less than 90°.

In assembling the annulus to the vessel and vessel closure member, seats are provided for the two legs of the annulus, said seats being dimensioned and arranged so that the angle between the two seats is less than the normal free angle between the two legs of the annulus. Thus, when the annulus is put in place on its seats and the closure member tightly engaged with the vessel, the legs of the annulus will be deflected toward each other so that the metal of the annulus, particularly at the bend thereof or joinder point of the two legs, will be prestressed. When pressure is exerted on the seal from the interior of the vessel, the stress in the seal varies from one prestressed condition to a lesser stress or to a stress in the opposite direction. By providing a prestressed condition when there is no pressure in the vessel, the seal will be maintained in sealing condition as the pressure rises. Thus, the annulus can be operated under higher pressures than would be the case if the annulus was not prestressed. Because of the resilient nature of the seal, the seal can be used many times and the sealing will be positive even after repeated cyclings of pressure in the vessel. Because of the relatively low force required to deflect the legs relative to each other, a minimum of tightening force is required in putting the initial pressure on the seal when assembling the parts.

Another feature of the invention is that if desired, the surfaces of the seal or seat can be covered with a ductile or soft layer of metal such as silver, gold, lead, copper, etc., and various alloys to compensate for irregularities in the surfaces and for the purpose about to be described.

There may be a continuous motion between the surfaces of a seal and its seat for a high pressure vessel due to expansion which may be due to the changing state of equilibrium between the internal pressure and the resisting stresses in the vessel.

When high contact pressure exists between two contacting surfaces, it is known that the attractive force of surface atoms is high for a distance of one to three angstroms and when the surfaces approach the range of high contact forces, the surfaces may seize or weld. If the two surfaces also move relative to each other under these conditions, a tearing action will occur, which if sufficient in magnitude will cause "galling." The pressures involved between surfaces because of the design of the present invention are such as to materially reduce this tearing or "galling" action.

A form of corrosion wear which is believed by some authorities to be caused by internal friction induced by vibration, has been termed "fretting." Such a condition has been found to exist where high stresses exist in press fitted parts. The small relative play between surfaces may give rise to "galling" and tearing of small particles which oxidize.

In order to prevent such a defect, a soft non-oxidizable metal can be placed on one of the surfaces which are in contact. This may be, for example, silver, gold or suitable alloys. It can be deposited on the involved surface in various manners such as by electro-plating or by chemical deposition. There should be a difference in melting temperature between the metals. Silver plating of the metallic seal, for example, will prevent oxidation and also will prevent fusion or welding because of the difference in melting points between silver and steel. Also, silver and 3.4% lead, or silver coated with indium subjected to heat treatment can be employed.

Because of the relatively low force required to assemble the parts due to the resilient character of the seal, there will be less likelihood of damage to the parts. Also the parts can be arranged so as always to have a predetermined relationship to each other upon tightening, the resiliency of the seal permitting the parts to be brought together upon assembly.

Figure 1:
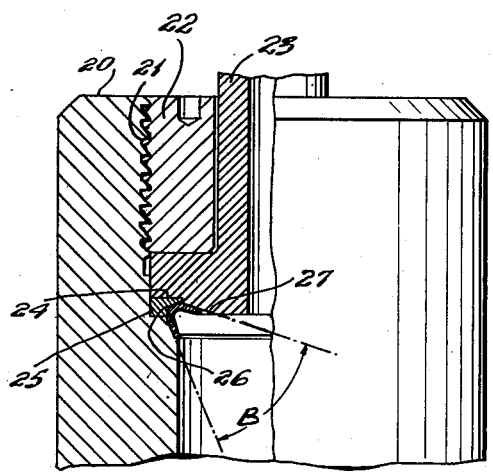
Figure 1 is a fragmentary view partially in section showing one form of seal.
Figure 3:
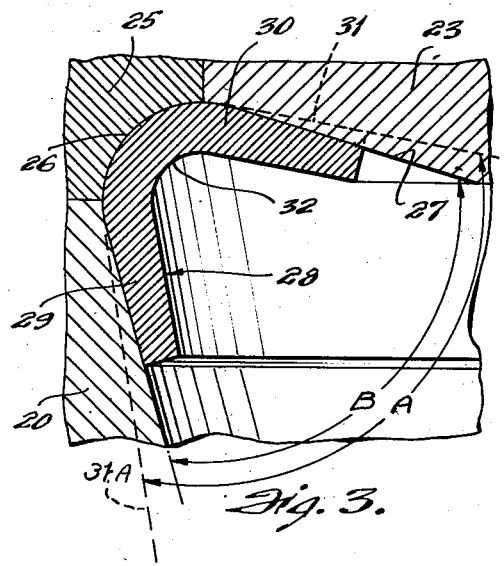
Figure 3 is a fragmentary enlarged view of the seal of Figure 1.
Figure 2:
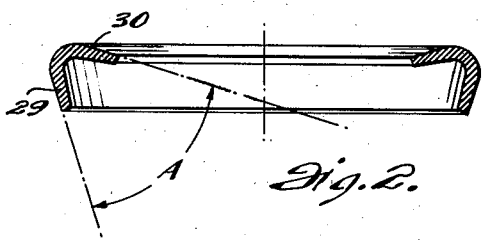
Figure 2 is an enlarged sectional view of the seal of Figure 1.

First a seal will be described having an annulus with the legs in the form of an L such as shown in Figures 1 to 3. The pressure vessel walls 20 may have a screw-threaded aperture 21 in which can be inserted a screw-threaded collar 22. The collar 22 can be employed to hold a plug 23 which in turn has a surface 24 engaging a shaped metal ring 25, said ring 25 having an arcuate recess 26 for the purpose of properly engaging the bend of the annulus. Plug 23 has an inclined surface 27 angularly disposed in a manner which will be described at a later point.

Annulus 28 has a leg 29 extending longitudinally or generally in the direction of the axis of the annulus. Transverse leg 30 extends in a plane generally transverse to the axis of the annulus, it being noted that the leg in the form shown is at an angle less than 90° relative to said axis. It is to be understood, of course, that the angle between the legs may be greater or less than 90° depending upon the specific relation of the parts.

The angle A (Fig. 2) between the transverse leg 30 and longitudinally extending leg 29 when the annulus is in a free position is greater than the angle B (Fig. 3) between said legs so that when the annulus is in assembled position relative to the closure plug and vessel, the legs will be deflected inwardly relative to each other and thus will be prestressed. The free position of the transverse leg of the annulus is indicated by the dotted lines 31 and 31A of Figure 3, wherein is shown the assembled relation of the parts. It will be evident that when the annulus is in assembled relation relative to the vessel and closure plug, that the legs will be in a prestressed condition relative to each other so that, for example, the inner area of the annulus will have the fibres of the metal under compression and the outer layers under tension.

It should be evident that the legs of the annulus are arranged such that there will be a force exerted against the vessel and closure plug or the seat accommodating the seal so as to assist in maintaining the seal. Unusually high stresses will not be set up in the seal nor will it be permanently distorted because of unevenness in expansion of the cap and vessel.

As mentioned previously, preferably, the seal is made of some suitable metal, such as brass, stainless steel, or other suitable materials having similar characteristics of resiliency. It is apparent that the seal is useable with various forms of vessels and closure plugs and that the invention is not limited to a seal employing the specific type of locking ring and plug shown in Figure 1. For example, the plug 45 can be held in place by bolts 44 as seen in Figure 4, similar parts being given identical reference characters.

Figure 4:
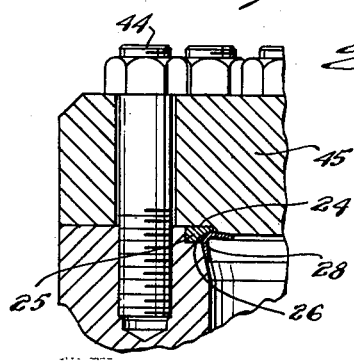
Figure 4 shows a modification of Figure 1 wherein the plug is bolted in place.

In Figure 4, the vessel is closed by a cover 45 held in place by bolts 44. The seal seat 25 and seal ring 28 are similar to the seal described for Figures 1 to 3. It is to be understood that a closure bolted in place can be used instead of a screw plug when desired.

The metal of the seal should have the proper modulus of elasticity for the desired purpose. For example, brass with a modulus of elasticity of 11,500,000 p. s. i. or steel with a modulus of elasticity of 30,000,000 p. s. i. would be satisfactory.

As previously mentioned, a surface coating can be placed on one or both of the surfaces involved so as to prevent "fretting" and galling.

The seal of this invention is particularly useful for high pressures where it is difficult to prevent leakage. The seal includes an arrangement whereby the seal element is placed in a prestressed condition when assembled with the vessel and closure member. A minimum of tightening force is required and the seal can be used numerous times and subjected to numerous pressure cycles without failure. The sealing will be positive at both low pressure and high pressure. The seal will be easy to manufacture and fit because of the resilient characteristics thereof. In the case of a hollow vessel of relatively large diameter and a rigid solid or similar closure member, the expansion of the cap or closure will be substantially zero or very small, whereas the vessel will expand considerably. Thus, there will be a large disparity in the expansion of the two members which the present invention will take care of without damage to the seal upon repeated cycling of the pressure. Also the seal upon initial tightening will conform readily without use of high tightening pressures. It is evident that changes may be made in the various details of construction, including the specific shapes of the seal walls illustrated, without departing from the spirit of the invention except as defined in the appended claims.

What is claimed is:

1. In a pressure vessel having an opening therein, the combination including a closure for said opening, a seal seat ring means having a curved surface, angularly disposed seal seats on said vessel and closure respectively adjacent the junction thereof, said seal seat ring means being positioned between said vessel and closure with the curved surface thereof disposed inwardly of the vessel and extending between the adjacent edges of said angularly disposed seal seats; and a resilient metal seal annulus comprising a pair of legs joined by a curved portion, one of said legs extending substantially longitudinally of the axis of the annulus and the other leg extending substantially transversely of said axis, the legs of said seal annulus contacting said seal seats, and the curved portion thereof contacting the curved surface of said seal seat ring means; said legs being disposed at a greater angle to each other before the annulus is assembled on said seats with said vessel and closure than the angle between said seal seats so that said annulus is in a prestressed condition when the vessel, closure, and annulus are in assembled relationship, the yield point of the metal annulus between the end portions of said legs not being exceeded so that said annulus can regain its shape when removed.

2. In a pressure vessel having an opening therein, the combination including a closure for said opening, a seal seat ring means having a curved surface, angularly disposed seal seats on said vessel and closure respectively adjacent the junction thereof, said seal seat ring means being positioned between said vessel and closure with the curved surface thereof disposed inwardly of the vessel and extending between the adjacent edges of said angularly disposed seal seats; and a resilient metal seal annulus comprising a pair of legs joined by a curved portion, one of said legs extending substantially longitudinally of the axis of the annulus and the other leg extending substantially transversely of said axis, the legs of said seal annulus contacting said seal seats, and the curved portion thereof contacting the curved surface of said seal seat ring means; said legs being disposed at a greater angle to each other before the annulus is assembled on said seats with said vessel and closure than the angle between said seal seats so that said annulus is in a prestressed condition when the vessel, closure, and annulus are in assembled relationship, the yield point of the metal annulus between the end portions of said legs not being exceeded so that said annulus can regain its shape when removed, and a coating of soft metal between said seal annulus and said seal seats to prevent galling.

JOSEPH V. BERTRAND.

References Cited in the file of this patent

UNITED STATES PATENTS

| Number | Name | Date |
| --- | --- | --- |
| 84,864 | Densmore | Dec. 15, 1868 |
| 1,339,636 | Tulloch | May 11, 1920 |
| 1,449,615 | McLeod | Mar. 27, 1923 |
| 2,016,223 | Bowers | Oct. 1, 1935 |
| 2,062,589 | Lucas | Dec. 1, 1936 |
| 2,126,505 | Risser | Aug. 9, 1938 |
| 2,291,763 | Sandberg | Aug. 4, 1942 |
| 2,311,240 | Marien et al. | Feb. 16, 1943 |

FOREIGN PATENTS

| Number | Country | Date |
| --- | --- | --- |
| 264,524 | Great Britain | Feb. 2, 1928 |
| 397,603 | Great Britain | Aug. 31, 1933 |
| 493,575 | Great Britain | Oct. 11, 1938 |
| 817,534 | France | Sept. 4, 1937 |